US012739030B2

(12) United States Patent
Desjardins et al.

(10) Patent No.: US 12,739,030 B2
(45) Date of Patent: Sep. 15, 2026

(54) AUTOMATED VALIDATION FOR STANDALONE LINE-SITE DEPLOYMENT

(71) Applicant: Ciena Corporation, Hanover, MD (US)

(72) Inventors: Marc Desjardins, Ottawa (CA); Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 257 days.

(21) Appl. No.: 18/632,676

(22) Filed: Apr. 11, 2024

(65) Prior Publication Data

US 2025/0323722 A1 Oct. 16, 2025

(51) Int. Cl.
*H04B 10/077* (2013.01)

(52) U.S. Cl.
CPC ................................ *H04B 10/0775* (2013.01)

(58) Field of Classification Search
CPC .................................................. H04B 10/0775
See application file for complete search history.

(56) References Cited

U.S. PATENT DOCUMENTS 6,654,354 B1 * 11/2003 Watkins ................ H04L 41/145 370/258
6,765,659 B1 * 7/2004 Bhatnagar .......... H04B 10/0775 356/73.1
7,027,214 B2 * 4/2006 Charlet ............. H04B 10/2941 359/334
8,422,121 B2 * 4/2013 Itoh ...................... H04B 10/294 359/337.13
8,509,621 B2 * 8/2013 Boertjes ............. H04J 14/0212 398/83
9,344,191 B2 5/2016 Al Sayeed et al.
9,485,013 B2 11/2016 Al Sayeed et al.
9,577,763 B2 2/2017 Al Sayeed et al.
9,768,902 B2 9/2017 Al Sayeed et al.
9,806,803 B2 10/2017 Bownass et al.
9,837,788 B2 * 12/2017 Akasaka ................. H01S 3/302
9,882,634 B1 1/2018 Al Sayeed et al.
9,906,294 B2 2/2018 Al Sayeed et al.
9,918,148 B2 3/2018 Swinkels et al.
9,973,295 B2 5/2018 Al Sayeed et al.
9,985,726 B1 5/2018 Al Sayeed et al.
9,986,317 B1 5/2018 Al Sayeed et al.
(Continued)

*Primary Examiner* — Kenneth N Vanderpuye
*Assistant Examiner* — Asif Shameem
(74) *Attorney, Agent, or Firm* — Baratta Law PLLC; Lawrence A. Baratta, Jr.

(57) ABSTRACT

Systems and methods for testing Optical Network Elements (ONEs) are provided. A process, according to one implementation, includes switching a first broadband switch of a remote ONE from a first output to a second output. The first output of the first broadband switch enables direct transmission to a line-out port configured for connection with a first fiber span of a pair of external fiber spans. The process also includes switching a second broadband switch of the remote ONE from a first input to a second input. The first input of the second broadband switch enables direct reception from a line-in port configured for connection with a second fiber span of the pair of external fiber spans. Switching the first broadband switch to the second output and switching the second broadband switch to the second input enables propagation through a loopback connection for testing the remote ONE.

20 Claims, 8 Drawing Sheets

(56) References Cited

U.S. PATENT DOCUMENTS

| | | | |
|---|---|---|---|
| 10,063,313 | B1 | 8/2018 | Al Sayeed et al. |
| 10,237,011 | B2 | 3/2019 | Al Sayeed et al. |
| 10,361,957 | B1 | 7/2019 | Mackay et al. |
| 10,439,709 | B1 | 10/2019 | Al Sayeed |
| 10,536,235 | B2 | 1/2020 | Al Sayeed et al. |
| 10,547,404 | B1 | 1/2020 | Al Sayeed et al. |
| 10,560,212 | B2 | 2/2020 | Al Sayeed et al. |
| 10,587,339 | B1 | 3/2020 | Al Sayeed et al. |
| 10,686,543 | B1 | 6/2020 | Al Sayeed et al. |
| 10,735,837 | B1 | 8/2020 | Al Sayeed et al. |
| 10,826,601 | B2 | 11/2020 | Bhatnagar et al. |
| 10,826,641 | B1 | 11/2020 | Al Sayeed et al. |
| 10,833,791 | B1 | 11/2020 | Al Sayeed |
| 10,868,614 | B2 | 12/2020 | Al Sayeed et al. |
| 10,897,321 | B1 | 1/2021 | Al Sayeed |
| 10,985,838 | B1 | 4/2021 | Al Sayeed et al. |
| 10,992,374 | B1 | 4/2021 | Miedema et al. |
| 11,108,489 | B1 | 8/2021 | Archambault et al. |
| 11,223,423 | B1 | 1/2022 | Al Sayeed et al. |
| 11,444,719 | B2 | 9/2022 | Al Sayeed et al. |
| 11,637,635 | B1 | 4/2023 | Al Sayeed |
| 11,777,634 | B2 | 10/2023 | Al Sayeed et al. |
| 2021/0152900 | A1 | 5/2021 | Al Sayeed et al. |
| 2022/0069903 | A1 | 3/2022 | Chen et al. |
| 2022/0166500 | A1 | 5/2022 | Bownass et al. |
| 2022/0255282 | A1 | 8/2022 | Al Sayeed et al. |
| 2023/0032707 | A1 | 2/2023 | Al Sayeed et al. |
| 2023/0053180 | A1 | 2/2023 | Al Sayeed et al. |
| 2023/0116474 | A1 | 4/2023 | Al Sayeed |
| 2023/0163844 | A1 | 5/2023 | Al Sayeed |
| 2023/0164468 | A1 | 5/2023 | Sayeed et al. |
| 2023/0208547 | A1 | 6/2023 | Al Sayeed |
| 2023/0275656 | A1 | 8/2023 | Sayeed et al. |
| 2024/0014917 | A1 | 1/2024 | Al Sayeed et al. |
| 2024/0080093 | A1 | 3/2024 | Al Sayeed |

* cited by examiner

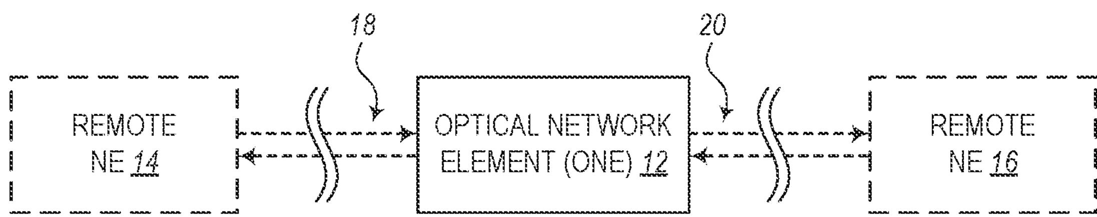
FIG. 1
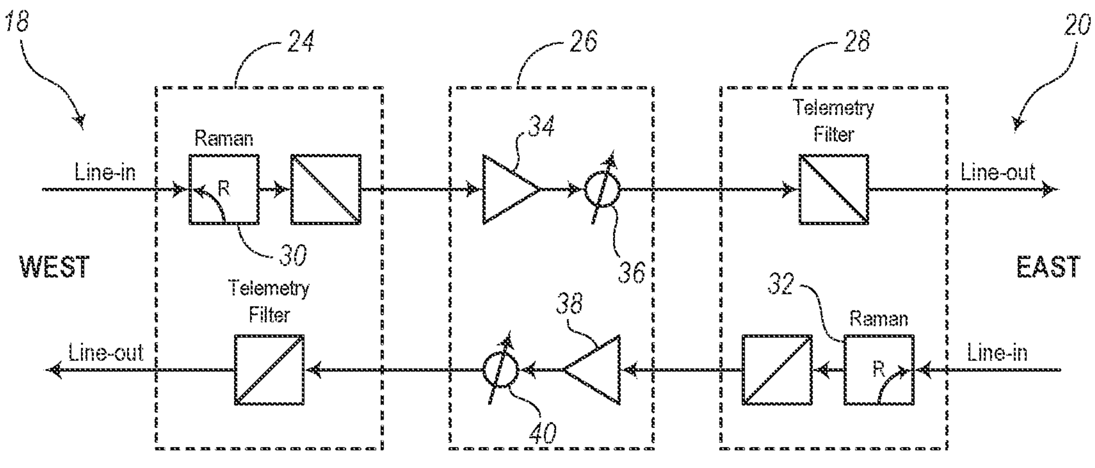
FIG. 2

212
206
236
200
234
210
204
232

230
208
228
202
214
MUX / DEMUX
216
Tx / Rx
X
R

AUTOMATED VALIDATION FOR STANDALONE LINE-SITE DEPLOYMENT

FIELD OF THE DISCLOSURE

The present disclosure generally relates to optical networking systems and methods. More particularly, the present disclosure relates to an automated validation test for self-checking an Optical Network Element (ONE) that is newly installed within a network before connection with external components of the network.

BACKGROUND

Generally, installation and deployment of network components throughout a network can be challenging. When a component is initially installed, a common practice is to test the component before the installer leaves the premises. Otherwise, if errors are discovered in the installation after the installer has left the site and/or if the equipment is found to be defective after the installer has left the site, then the installer or another team will need to return to the site to fix the issues. Also, some installers may not be knowledgeable of the components being installed and may cause damage to the components or to themselves if they are inexperienced or careless. Therefore, there is a need in the field of network deployment to improve conventional installation and deployment practices by simplifying the process and reducing damage or injury to network components and installers.

BRIEF SUMMARY

The present disclosure is directed to Optical Network Element (ONEs) that are being installed, whereby the ONEs themselves may include self-testing assemblies built into the device to enable standalone testing. Also, the present disclosure is directed to remote controller systems that can remotely control a newly installed ONE to configure the ONE in a self-test mode, and then, the remote controller system can obtain measurements from the ONE and inform network personnel if there are any issues with the installation or installed equipment.

Therefore, an ONE, according to various embodiments of the present disclosure, may include a line-out port configured for connection with a first fiber span of a pair of external fiber spans. The ONE may also include a line-in port configured for connection with a second fiber span of the pair of external fiber spans. The ONE may also include a first broadband switch having a first output and a second output. The first output of the first broadband switch, for example, may be coupled directly to the line-out port. Also, the ONE may include a second broadband switch having a first input and a second input. The first input of the second broadband switch, for example, may be coupled directly to the line-in port. Furthermore, the ONE may include a loopback connection arranged between the second output of the first broadband switch and the second input of the second broadband switch.

According to some embodiments, the action of switching the first broadband switch to the second output and switching the second broadband switch to the second input causes optical signals to propagate through the loopback connection to enable loopback testing of the ONE. In some embodiments, the ONE may further include a laser source configured to produce Amplified Spontaneous Emission (ASE) test signals. For example, when the first broadband switch is switched to the second output and the second broadband switch is switched to the second input, the ASE test signals are propagated through the loopback connection for testing the ONE. Also, the ONE may include a Raman amplifier that is coupled to an output of the second broadband switch. For example, the Raman amplifier may include a plurality of pumps, wherein, during a loopback test involving the loopback connection, each pump of the Raman amplifier may be turned on, one at a time, at a low power level.

The ONE, in some embodiments, may further include a second line-out port configured for connection with a first fiber span of a second pair of external fiber spans and a second line-in port configured for connection with a second fiber span of the second pair of external fiber spans. Also, the ONE may include a third broadband switch having a first output and a second output, wherein the first output of the third broadband switch may be coupled directly to the second line-out port. The ONE may also include a fourth broadband switch having a first input and a second input, wherein the first input of the fourth broadband switch may be coupled directly to the second line-in port. In this embodiment, the ONE may also include a second loopback connection arranged between the second output of the third broadband switch and the second input of the fourth broadband switch.

In some implementations, the ONE may also include a pre-amp switch and an amplifier, an output of the pre-amp switch connected to the amplifier. The pre-amp switch may be configured in either a test power mode or a gain mode. In the test power mode, the pre-amp switch may be configured to provide Amplified Spontaneous Emission (ASE) test signals to the amplifier (and points beyond) for testing the ONE. In the gain mode, for example, the pre-amp switch may be configured to pass incoming signals to the amplifier for regular amplification purposes according to normal operation.

Furthermore, according to some embodiments, the ONE may be an Intermediate Line Amplifier (ILA), a Reconfigurable Optical Add/Drop Multiplexer (ROADM), a Terminal Line Amplifier (TLA), or other suitable network component. In some embodiments, the ONE may include multiple Optical Supervisory Channel (OSC) and telemetry components for monitoring optical signals propagating through the ONE, where the OSC, telemetry, and Data Communication Network (DCN) components may monitor connectivity and loss parameters and communicate these parameters to a remote management system for determining a condition of the ONE. In the network, in some test cases (primarily during the deployment phase), knowing the reach of a transponder (Tx/Rx) to carry data over the real fiber spans is useful, and if it cannot achieve the desired distance, then it is important to figure out the exact fiber location, where it is getting into out-of-reach. In some cases, this exercise is important for link budget power-hunt exercise point of view to identify optimal launch powers for a given pair of fiber-spans. The ONE may be part of a network that includes one or more additional optical network elements, where each network element includes one or more loopback connection assemblies for enabling loopback testing along different portions of the network. Looping back on a fiber-span will provide such opportunity, where line-side loopback can be activated per fiber-pair one by one as if a ladder network.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 1 is a block diagram illustrating a network in which an Optical Network Element (ONE) is newly installed, according to various embodiments.

FIG. 2 is a schematic diagram illustrating an example of the ONE shown in FIG. 1, the ONE having West and East interfaces for connection with other elements in the network, according to various embodiments.

DETAILED DESCRIPTION

Figure 3A:
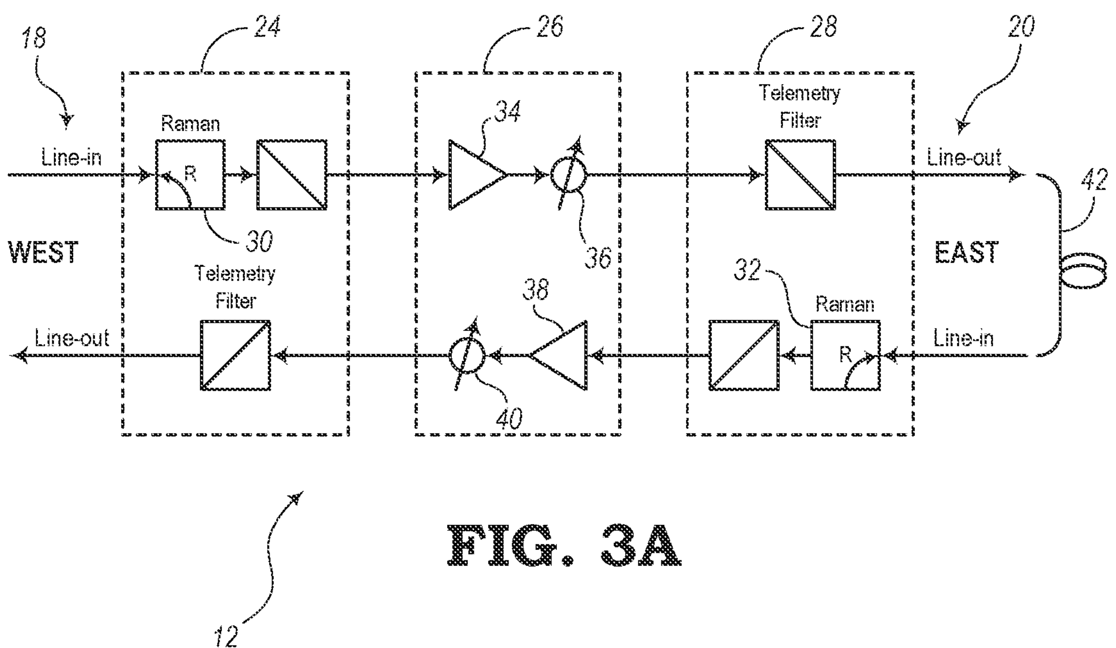
FIG. 3A is a schematic diagram illustrating a strategy for testing the ONE of FIG. 2 upon installation in the network by connecting an extended fiber spool to the ports of the East interface.

The present disclosure relates to systems and methods for performing standalone or isolated tests on network elements or nodes, where the tests are performed independently of other network equipment within a network. Also, according to the embodiments of the present disclosure, the standalone tests can be performed during an installation phase when an installer has set up a new network element for use in the network, but before the new network element has been put into operation and/or before it is connected to the other network equipment. Furthermore, in some embodiments, the standalone testing can be performed without the use of any external fiber spools that an installer might connect to input and output ports of the newly installed network element.

New Network Installations

FIG. 1 is a block diagram illustrating a simplified example of a network 10 in which an Optical Network Element (ONE) 12 is newly installed. The ONE 12, for example, may be a node, Intermediate Line Amplifier (ILA), Reconfigurable Optical Add/Drop Multiplexer (ROADM), switch, router, etc. In this example, the ONE 12 has two interfaces (or degrees) and is installed between a first remote Network Element (NE) 14 and a second remote NE 16, which may already exist in the network 10 and may already be put into operation. The ONE 12 includes a first pair of ports that are connected to (or are planned to be connected to) a first pair of lines 18 (e.g., fiber spans, optical links, fiber optic cables, etc.) leading to the first remote NE 14. Also, the ONE 12 includes a second pair of ports that are connected to (or are planned to be connected to) a second pair of lines 20 leading to the second remote NE 16.

However, as described in the present disclosure, the presence of the remote NEs 14, 16 do not come into play with respect to the standalone testing described herein, whereby the entire testing process can be performed without depending on the remote NEs 14, 16 and also does not rely on any existing or planned connectivity to these remote NEs 14, 16 via, for example, the first and second pairs of lines 18, 20. Instead, as described herein, the standalone testing can be performed internally within the ONE 12 itself in an isolated manner with respect to the rest of the network 10. In this way, an installer can install the ONE 12 and perform an automated isolated test on the ONE 12. If the test reveals that there are issues with the ONE 12, the installer can make modifications while on site until the ONE 12 is found to be satisfactory. When the ONE 12 is tested and found to be operational, the installer can then continue with other jobs, such as connecting the first and second pairs of lines 18, 20 to the ports of the ONE 12, leaving the site to perform another installation at another site, etc.

The embodiments of the present disclosure are meant to fulfill a desire of network owners and network operators who want to be able to deploy nodes independently without any dependency on any upstream and downstream nodes. The upstream and/or downstream nodes, for example, may (or may not) be optically connected. Also, the upstream and/or downstream nodes may (or may not) even be commissioned for basic communications. Outgoing and incoming fiber spans (e.g., pairs of lines 18, 20) may (or may not) be connected at line-out and line-in port locations. In other words, tests can be performed even if fiber vendors have not installed the fiber spans between the newly installed component (e.g., ONE 12) and the corresponding adjacent components (e.g., remote NEs 14, 16) or if the fiber spans have been installed but are not ready for operation.

Figure 4:
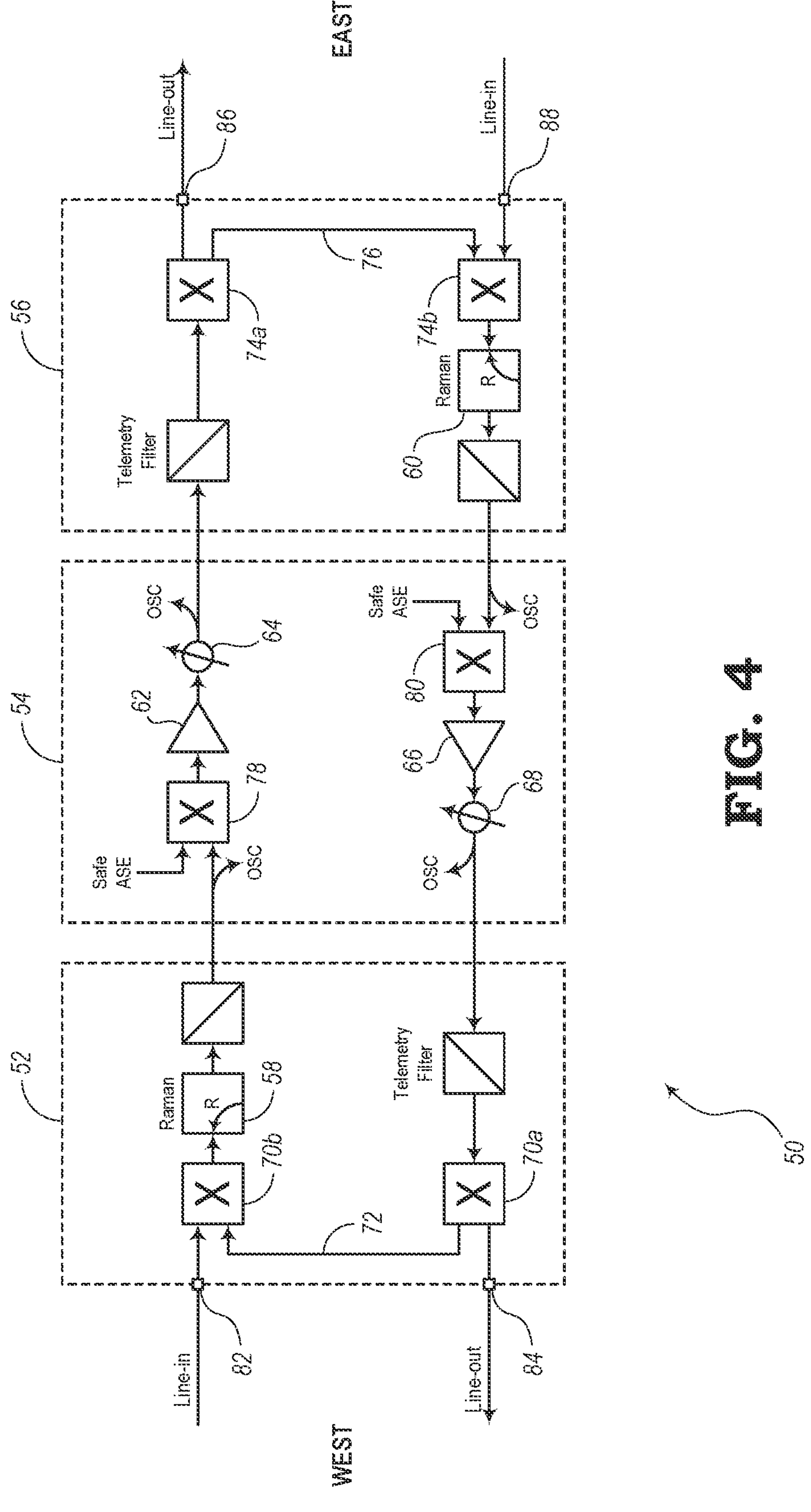
FIG. 4 is a schematic diagram illustrating a ONE having loopback connections at the West and East interfaces for enabling automatically testing of the ONE upon installation in a network, according to various embodiments of the present disclosure.
Figure 7:
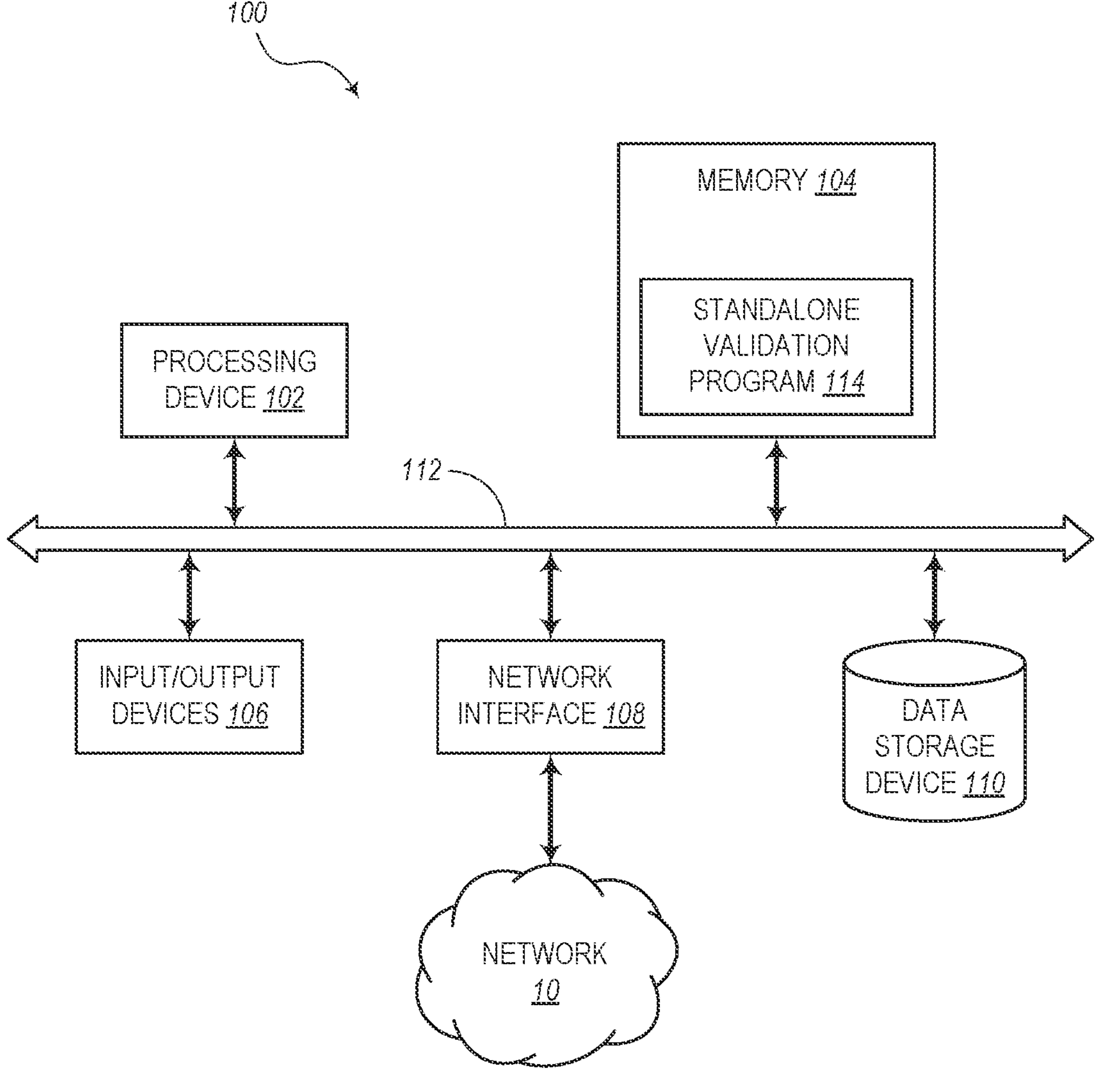
FIG. 7 is a controller for remotely controlling the ONE of FIG. 4 to run automatic standalone testing of the ONE using the loopback connections, according to various embodiments.

According to some embodiments, such as those described with respect to FIGS. 4 and 7, a remote controller (e.g., controller 100 of FIG. 7) can be used to remotely initiate the standalone validation test. This too fulfills a desire of network owners and network operators who wish to test remotely while ensuring locally (e.g., while an installer is still on site) that intra-node connections are good (e.g., no loose or open connectors). Also, the customers (e.g., network owners, network operators, etc.) may wish to test the newly installed component to ensure that devices within the node (or ONE 12) are in good operating condition. For example, the standalone test can determine whether amplifiers (e.g., Erbium Doped Fiber Amplifiers (EDFAs), Raman amplifiers, etc.) are able to generate power, turn on all pumps, etc. Again, these tests can be performed automatically while the installer is still on site to allow the customer to verify that the objectives of the ONE 12 are met and that errors (if any) can be corrected before the installer leaves the site.

FIG. 2 is a schematic diagram illustrating an example of the ONE 12 shown in FIG. 1. As illustrated in this embodiment, the ONE 12 includes a "West" interface (or degree) corresponding to the first pair of lines 18, having a line-in and a line-out. Also, the ONE 12 includes an "East" interface (or degree) corresponding to the second pair of lines 20 and also having a line-out and a line-in. As shown, a top path includes a line-in from the West degree leading to the line-out of the East degree (from left to right on the page), and a bottom path includes a line-in from the East degree leading to the line-out of the West degree (from right to left on the page).

Furthermore, the ONE 12 includes a first module 24, a second module 26, and a third module 28 in this example. The first module 24 includes a Raman amplifier 30 configured at the line-in port from the West degree. The third module 28 includes a Raman amplifier 32 configured at the line-in port from the East degree. The second module 26 includes an amplifier 34 (e.g., EDFA) and a Variable Optical Attenuator (VOA) 36 extending in the West-to-East direction (i.e., top path) and an amplifier 38 (e.g., EDFA) and a VOA 40 extending in an East-to-West direction (i.e., bottom path).

With the hardware of the ONE 12 arranged as illustrated in FIG. 2, an installer may perform a certain type of isolated testing, as described in the present disclosure. This isolated or standalone test can be performed independently of other equipment (e.g., remote NEs 14, 16) within the network 10. For example, one such isolated test is shown with respect to FIGS. 3A and 3B.

Manual External Fiber Spool Connection

FIG. 3A is a schematic diagram illustrating the ONE 12 of FIG. 2 with respect to a strategy for isolated testing of the ONE 12 upon installation within the network 10. A first step may include leaving one interface (e.g., the West degree) open or disconnected (as shown) from the pair of lines 18, while connecting the ends of an external fiber spool 42 between the line-out and line-in ports of the second pair of lines 20 on the other end (e.g., East interface) in an external loopback configuration. According to this procedure, an installer may normally use a fiber spool (e.g., external fiber spool 42) that is at least about 20 kms in length, even perhaps more than 50 kms in length in some cases. The length may be selected based on an estimated distance from the ONE 12 to the adjacent remote NE 16 in the East direction. Thus, the long fiber span can simulate actual optical fiber cables that may be used upon deployment of the ONE 12 when connected with the adjacent node.

With the external fiber spool 42 connected, the installer may then configure the amplifier 34 into a "forced" power generation mode. Since the amplifier 34 has an open connection at the West line-in port, the forced power generation mode might typically force the amplifier 34 to remain in an Optical Line Fail (OLF) condition or an automatic-shutoff condition. A number of Optical Supervisory Channel (OSC) and telemetry components (e.g., telemetry filters, DCN, etc.) (not shown in FIGS. 2, 3A, and 3B) may be used to measure optical power at various points within the ONE 12. With the external fiber spool 42 in place on the East interface, optical signals (directed initially in the West-to-East direction) may be measured at the output of the VOA 36 and at the telemetry filter of the third module 28. Then, with the external fiber spool 42 connected, the optical signals are looped back and reverse directions (to the East-to-West direction). The reversed optical signals can then be measured at the telemetry filter at the output of the Raman amplifier 32 of the third module 28, at the input to the amplifier 38, at the output of the VOA 40, and at the telemetry filter of the first module 24. Of course, additional (or fewer) measurement points may be included for self-testing. In some embodiments, the OSC and telemetry measurements can be provided to a remote controller for performing a standalone test of the ONE 12 independent of other components in the network 10.

In this example, the Raman amplifier 32 may be configured to automatically run an Optical Time-Domain Reflectometry (OTDR) test for go/no-go decisions, since this test involves external fibers (i.e., external fiber spool 42) and OTDR reflections. Point losses may be within pre-defined thresholds before turning on the pumps of the Raman amplifier 32 to guarantee laser safety and to reduce fiber-tip damage. To avoid issues with OTDR go/no-go decisions for Raman turn-up, at least a 20 km fiber spool is normally required for installers to use. Of course, it may be noted that carrying such a large fiber spool can be quite cumbersome for the installer. Also, to test the Raman amplifier 32 with the lengthy external fiber spool 42, it may be noted that the Raman amplifier 32 will need to operate at full power to simulate real-world conditions, which can be risky in some situations.

Figure 3B:
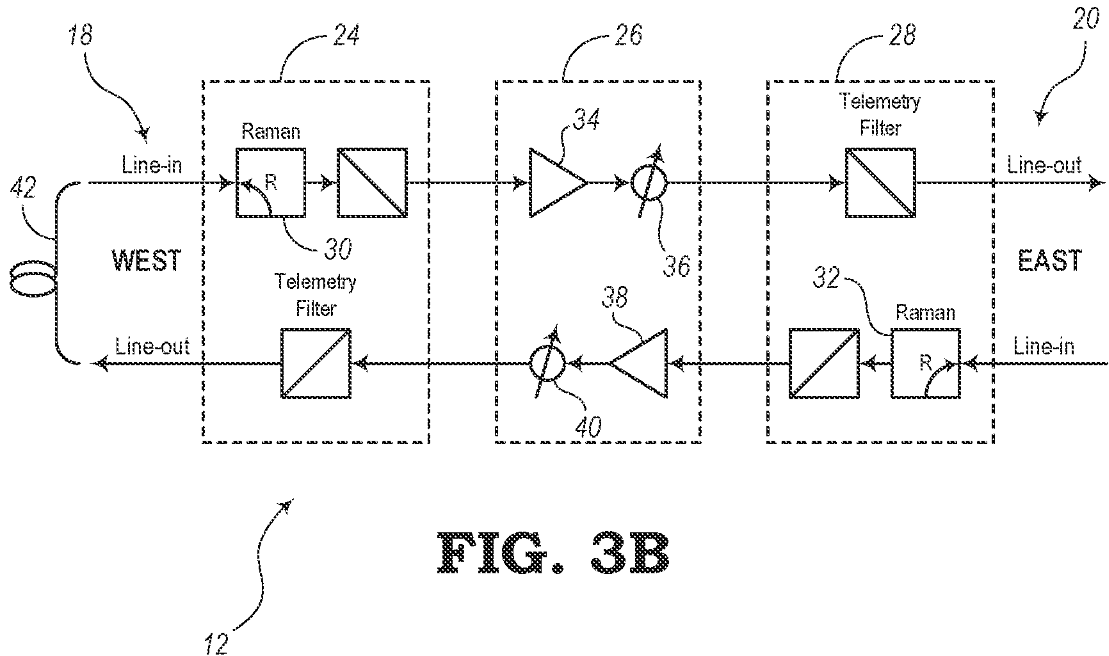
FIG. 3B is a schematic diagram illustrating a strategy for testing the ONE of FIG. 2 upon installation in the network by connecting the extended fiber spool to the ports of the West interface.

FIG. 3B is a schematic diagram illustrating the ONE 12 arranged for the next stage of the isolated testing. Once the Raman amplifier 32 is verified at the East end, the installer manually switches off the forced power generation mode of the amplifier 34 and sets the amplifier 34 at a regular mode (e.g., "gain mode" for normal amplification purposes) mode. The installer puts the amplifier 32 in the regular mode at this point in the testing in order to avoid potential transients (i.e., massive spikes) and Q-switching effects while testing the other end. Also, the external fiber spool 42 is then disconnected from the East end and moved to the other end (i.e., West side), as shown in FIG. 3B, to verify other components of the ONE 12. With the external fiber spool 42 connected in the external loopback configuration as shown in FIG. 3B, the installer can then put the amplifier 38 into a forced power generation mode. Again, OSCs and telemetry components can measure optical power at different points to evaluate the operability of the ONE 12 and test the Raman amplifier 30 in the first module 24. Once all the tests are completed, the amplifiers 34, 38 are switched to normal operational mode and the external fiber spool 42 is disconnected. Then, the installer can leave the site.

Although the isolated testing process described with respect to FIGS. 2, 3A, and 3B is able to test the ONE 12 without relying on adjacent nodes, it may be noted that this procedure has certain shortcomings. For example, it can be cumbersome for an installer to haul a fiber spool (e.g., external fiber spool 42), which may be particularly heavy (e.g., 40-60 pounds), from one site to another. Also, with external line-ins and line-outs operating at full strength, there is a risk of eye damage to the installer caused by laser emissions at loose or unconnected ports. Furthermore, the procedure described above involves the installer performing several manual steps that have to be done sequentially and methodically. It can be easy for an inexperienced installer to make mistakes in the field, which may require follow-us visits, damage to expensive network equipment, damage to the eyes of the installer, etc.

Therefore, to improve the above-described procedure for testing a newly installed node independently of other network nodes, the present disclosure further describes additional embodiments of systems and methods for performing standalone or isolated testing without the above-mentioned drawbacks, as described in more detail below. For example, according to various embodiments of the present disclosure, switchable line-side optical loopbacks, which can be built into the installed nodes themselves, are proposed. Not only can the switchable loopback embodiments verify internal fiber connections and functionality of active photonic elements in a standalone node, but also the automated control process can simplify the testing procedures for inexperienced installers and reduce the risks of errors and injuries. The embodiments of the switchable line-side optical loopback systems and methods described below can be used for per fiber-pair network verifications for data-path connectivity and link budget analysis during an initial deployment phase.

Switchable Loopback Connections

FIG. 4 is a schematic diagram illustrating an embodiment of an ONE 50 according to various implementations. The ONE 50 in this embodiment includes many similarities to the ONE 12 described above with respect to FIG. 2. However, the ONE 50 additionally includes switchable loopback connections, one at each of the West and East interfaces, for enabling automatically testing of the ONE 50 upon installation in a network (e.g., network 10). Instead of an externally connected fiber spool, the loopback connections in this embodiment are incorporated directly within the ONE 50 itself and are dedicated to the standalone self-testing of the ONE 50 when the ONE 50 is first installed and/or before it is connected to adjacent network equipment.

As illustrated in FIG. 4, the ONE 50 includes a first module 52, a second module 54, and a third module 56. Similar to the ONE 12 described above, the ONE 50 includes a Raman amplifier 58 near the West line-in port 88 of the first module 52 and a Raman amplifier 60 near the East line-in port 84 of the third module 56. Also, the second module 54 includes an amplifier 62 (e.g., EDFA) and VOA 64 in the West-to-East path (i.e., the upper path extending from left to right on the page) and an amplifier 66 and VOA 68 in the East-to-West path (i.e., the lower path extending from right to left on the page).

Furthermore, the first module 52 includes broadband switches 70*a*, 70*b* and a loopback connection 72. The broadband switch 70*a*, having two selectable outputs, is configured to transmit signals to either the West line-out port 86 or to the loopback connection 72. Also, the broadband switch 70*b*, having two selectable inputs, is configured to receive signals from either the West line-in port 88 or from the loopback connection 72. During a standalone testing procedure, the broadband switches 70*a*, 70*b* are switched so as to provide optical test signals through the loopback connection 72 for performing a loopback test, while disconnecting the first module 52 from the West line-out port 86 and West line-in port 88.

Likewise, the third module 56 includes broadband switches 74*a*, 74*b* and a loopback connection 76. The broadband switch 74*a*, having two selectable outputs, is configured to transmit signals to either the East line-out port 82 or to the loopback connection 76. Also, the broadband switch 74*b*, having two selectable inputs, is configured to receive signals from either the East line-in port 84 or from the loopback connection 76. During the standalone testing procedure, the broadband switches 74*a*, 74*b* are switched so as to provide optical test signals through the loopback connection 76 for performing the loopback test, while disconnecting the third module 56 from the East line-out port 82 and East line-in port 84. According to some embodiments, the broadband switches 70*a*, 70*b*, 74*a*, 74*b* may all be switched for the testing mode at the same time to enable loopback on both ends. In other embodiments, the first set of switches 70*a*, 70*b* and second set of switches 74*a*, 74*b* may be switched for the testing mode at different times such that the ONE 50 can be tested in two stages.

The described embodiments of the two built-in switchable loopback connection assemblies each include a pair of broadband switches (e.g., broadband switches 70*a* and 70*b* or broadband switches 74*a* and 74*b*) and a corresponding loopback path (e.g., loopback connectors 72, 76). It is believed that these built-in switchable loopback connection assemblies include novel arrangements for standalone testing of a network element. That is, the embodiments described herein provide switchable, internally arranged, optical loopback assemblies on the line-facing ports of the nodes or ONEs. The loopback assemblies are arranged between line-out and line-in ports to allow the node to run standalone internal validation tests prior to any external fiber installation.

In addition, the second module 54 of the ONE 50 includes switches 78 and 80 (e.g., broadband switches). The switch 78, having two selectable inputs, is configured to be switched to receive either the signals from the first module 52 or to receive a "safe" Amplified Spontaneous Emission (ASE) optical signal from an internal ASE laser source. Likewise, the switch 80, having two selectable inputs, is configured to be switched to receive either the signals from the third module 56 or to receive a safe ASE optical signal from an internal ASE source, which may be same as or different from the ASE source associated with the switch 78. During the testing mode, the switches 78 and 80 can be switched (e.g., simultaneously or sequentially) for passing the ASE-based signals to the respective amplifiers 62, 66 and onto additional components to be tested in the ONE 50. The switches 78, 80 essentially create an optical seam with amplifiers 62, 66 while doing the loopback tests.

Again, in some embodiments, both switches 78 and 80 may be switched to ASE mode at the same time, while, according to other embodiments, the switches 78 and 80 may be switched to ASE mode at different times, depending on the switching patterns of the other switches 70*a*, 70*b*, 74*a*, 74*b*. After the testing procedure and determining that the installed node is free of issues, all the switches 70*a*, 70*b*, 74*a*, 74*b*, 78, 80 may be switched to regular mode to enable West-to-East communication and East-to-West communication while bypassing the ASE sources and loopback connections 72, 76.

Figure 5:
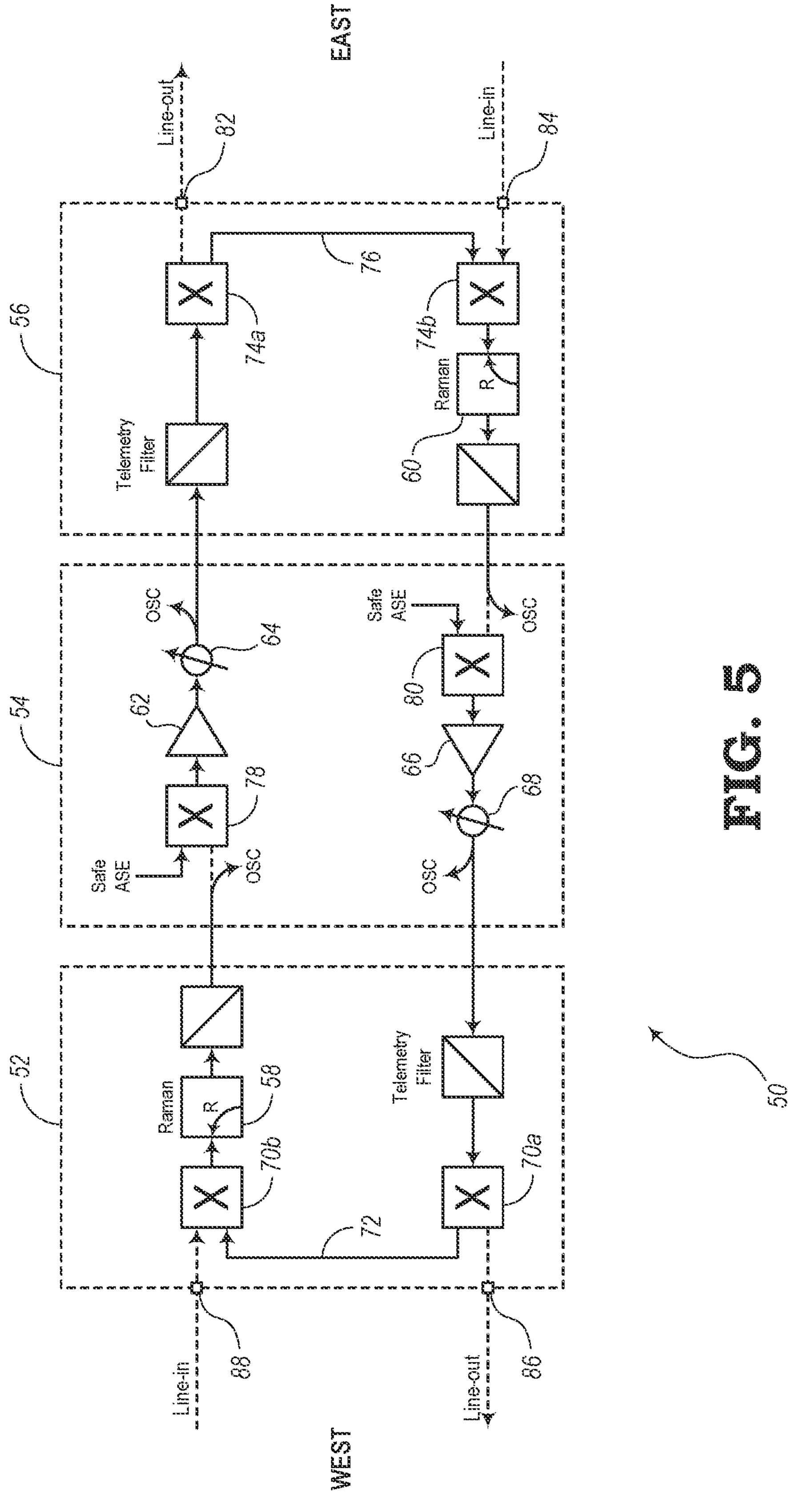
FIG. 5 is a schematic diagram illustrating the ONE of FIG. 4 switched for loopback connections at both the West and East interfaces for standalone testing of the ONE, according to various embodiments.

FIG. 5 is a schematic diagram illustrating the ONE 50 of FIG. 4 having been switched for loopback connections at both the West and East interfaces for standalone testing of the ONE 50. As shown, the ONE 50 is switched for operation of the entire standalone test in one stage, where both the switches 78, 80 are switched to provide ASE test signals and both loopback connectors 72, 76 are switched into the paths at both ends to include testing of all the components of the ONE 50 in one testing stage. It may be noted, however, that according to some embodiments, the switching may be performed in stages, whereby the switch 78 provides ASE test signals while the East end loopback connection 76 is engaged during one stage to test the amplifier 62, VOA 64, and Raman amplifier 60 in a first stage. Then, switch 78 is switched to regular mode and broadband switches 74*a*, 74*b* are switched away from the loopback connection 76. In the second test stage, the switch 80 provides ASE test signals to test the amplifier 66, VOA 68, and Raman amplifier 58, while the West end loopback connection 72 is engaged.

Therefore, according to various embodiments of the present disclosure, an Optical Network Element (ONE) may include a line-out port (e.g., East line-out port 82) configured for connection with a first fiber span (East "line-out") of a pair of external fiber spans. The ONE may also include a line-in port (e.g., East line-in port 84) configured for connection with a second fiber span (East "line-in") of the pair of external fiber spans. The ONE may also include a first broadband switch (e.g., broadband switch 74*a*) having a first output and a second output. The first output of the first broadband switch 74*a*, for example, may be coupled directly to the East line-out port 82. Also, the ONE may include a second broadband switch (e.g., broadband switch 74*b*) having a first input and a second input. The first input of the second broadband switch 74*b*, for example, may be coupled directly to the East line-in port 84. Furthermore, the ONE may include a loopback connection (e.g., loopback connection 76) arranged between the second output of the first broadband switch 74*a* and the second input of the second broadband switch 74*b*.

According to some embodiments, the action of switching the first broadband switch 74*a* to the second output and switching the second broadband switch 74*b* to the second input causes optical signals to propagate through the loopback connection 76 to enable loopback testing of the ONE. In some embodiments, the ONE may further include a laser source configured to produce Amplified Spontaneous Emission (ASE) test signals. For example, when the first broadband switch 74*a* is switched to the second output and the second broadband switch 74*b* is switched to the second input, the ASE test signals are propagated through the loopback connection 76 for testing the ONE. Also, the ONE may include a Raman amplifier (e.g., Raman amplifier 60) that is coupled to an output of the second broadband switch 74*b*. For example, the Raman amplifier 60 may include a plurality of pumps (e.g., six pumps), wherein, during a loopback test involving the loopback connection 76, each pump of the Raman amplifier may be turned on, one at a time, at a low power level.

The ONE, in some embodiments, may further include a second line-out port (e.g., West line-out port 86) configured for connection with a first fiber span (e.g., West "line-out") of a second pair of external fiber spans and a second line-in port (e.g., West line-in port 88) configured for connection with a second fiber span (e.g., West "line-in") of the second pair of external fiber spans. Also, the ONE may include a third broadband switch (e.g., broadband switch 70*a*) having a first output and a second output, wherein the first output of the third broadband switch 70*a* may be coupled directly to the second line-out port 86. The ONE may also include a fourth broadband switch (e.g., broadband switch 70*b*) having a first input and a second input, wherein the first input of the fourth broadband switch 70*b* may be coupled directly to the second line-in port 88. In this embodiment, the ONE may also include a second loopback connection (e.g., loopback connection 72) arranged between the second output of the third broadband switch 70*a* and the second input of the fourth broadband switch 70*b*.

In some implementations, the ONE may also include a pre-amp switch (e.g., switch 78) and an amplifier (e.g., amplifier 62), an output of the pre-amp switch 78 connected to the amplifier 62. The pre-amp switch 78 may be configured in either a test power mode or a gain mode. In the test power mode, the pre-amp switch 78 may be configured to provide Amplified Spontaneous Emission (ASE) test signals to the amplifier 62 (and points beyond) for testing the ONE. In the gain mode, for example, the pre-amp switch 78 may be configured to pass incoming signals to the amplifier 62 for regular amplification purposes according to normal operation.

Figure 8:
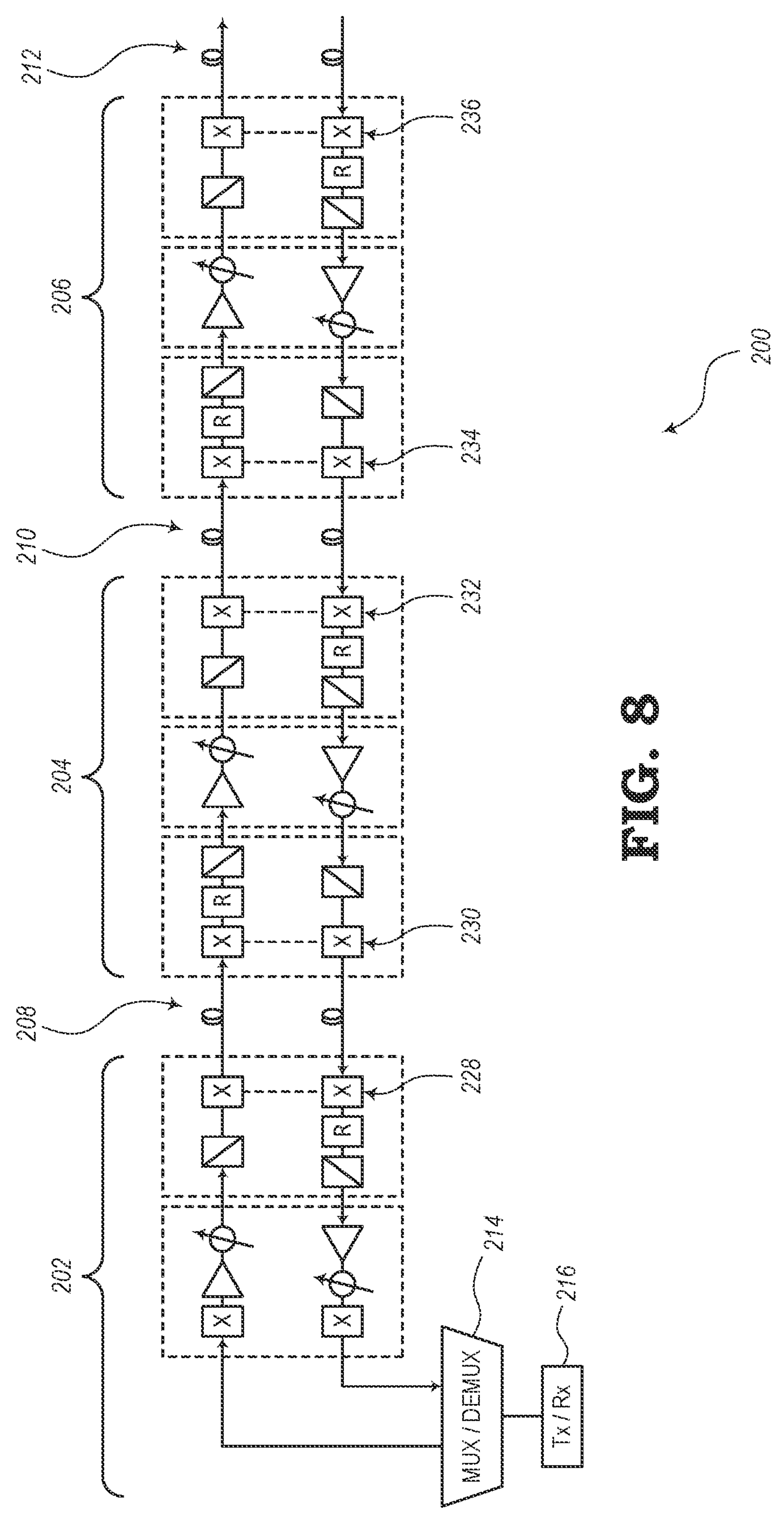
FIG. 8 is a schematic diagram illustrating a series of network nodes with loopback connections on each node to enable automatic testing of the nodes, according to various embodiments.

Furthermore, according to some embodiments, the ONE may be an Intermediate Line Amplifier (ILA), a Reconfigurable Optical Add/Drop Multiplexer (ROADM), a Terminal Line Amplifier (TLA), or other suitable network component. In some embodiments, the ONE may include multiple Optical Supervisory Channel (OSC) and telemetry components for monitoring optical signals propagating through the ONE, where the OSC, telemetry, and DCN components may monitor connectivity and loss parameters and communicate these parameters to a remote management system (e.g., controller 100 of FIG. 7) for determining a condition of the ONE. The ONE may be part of a network that includes one or more additional optical network elements, as shown in the embodiment of FIG. 8, where each network element includes one or more loopback connection assemblies for enabling loopback testing along different portions of the network.

Figure 6:
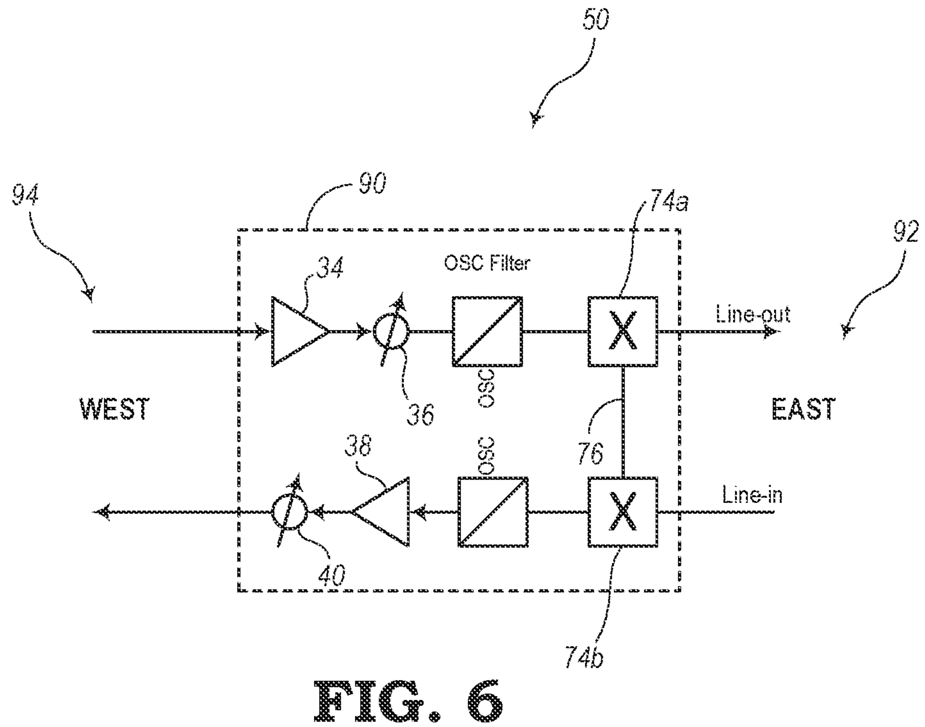
FIG. 6 is a schematic diagram illustrating a Terminal Line Amplifier (TLA) for the ONE 50 having been switched for loopback connections at the East interfaces for standalone testing of the ONE.

FIG. 6 is a schematic diagram illustrating a Terminal Line Amplifier (TLA) 90 for the ONE 50 having been switched for loopback connections at the East interfaces for standalone testing of the ONE 50. The TLA 90 can exclude Raman amplifiers and can be used in point-to-point links such as in data center interconnect applications. Here, one end 92 may include line-out and line-in ports, where another end 94 can be used for channel access points. Such configuration may or may not include Raman amplification. The loopback connection 76 can create an optical-seam created using a multi-stage amplifier 34, where the first stage is blocked, and 2nd-stage used for ASE generation, and wherein the amplifier 38 is in regulate gain mode.

Management System

FIG. 7 is a block diagram illustrating an embodiment of a controller 100 (or management system) for remotely controlling and monitoring the ONE 50 of FIG. 4 to automatically run standalone testing of the ONE 50 using the loopback connections 72, 76. The controller 100 may be configured as a computing system (e.g., Network Monitoring System (NMS), etc.) having processing capabilities and data storage capabilities. The controller 100 may be positioned at a Network Operations Center (NOC) or other monitoring, controlling, or administrating facility associated with the network 10. As shown, the controller 100 includes a processing device 102, memory 104, one or more Input/Output (I/O) devices 106, a network interface 108, and a data storage device 110. The components 102, 104, 106, 108, 110 may communicate with each other via a local bus interface 102.

The network interface 108 may be configured to interact with the network 10 and may communicate with the ONE 50 upon installation of the ONE 50 within the network 10. The communication with the ONE 50 enables the controller 100 to send control signals to the ONE 50 to place the ONE 50 in a self-testing state. When the ONE 50 performs the self-test, the ONE 50 is configured to obtain measurements of optical signals throughout the ONE 50 and communicate the measurements to the controller 100.

In particular, the controller 100 may include a standalone validation program 114, which may be implemented in any suitable form of hardware (e.g., in the processing device 102) and/or software or firmware (e.g., in memory 104). When stored in a non-transitory computer-readable medium (e.g., in memory 104), the standalone validation program 114 may include logic code having instructions that enable or cause the processing device 102 to perform the standalone testing or validating procedures described herein. Thus, the controller 100 can place the ONE 50 into a test mode after it has been installed. The controller 100 can monitor the condition of the ONE 50 to determine if it has been installed correctly and if it is operational. In some embodiments, the controller 100 can provide test results to a network operator or the installer on site to guide the installer with additional tasks to correct any errors while the installer is still on site.

It should be appreciated that the processing device 102 may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). Some or all of the functions of the standalone validation program 114 may be implemented by a state machine, stored program instructions, and/or one or more Application Specific Integrated Circuits (ASICs) of the processing device 102.

The memory 104 may include any combination of volatile memory elements (e.g., Random Access Memory (RAM), Dynamic RAM (DRAM), Synchronous DRAM (SDRAM), Static RAM (SRAM), and the like) and/or nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like). The memory 104 may incorporate electronic, magnetic, optical, and/or other types of storage media and may have a distributed architecture, where various components are situated remotely from one another, but can be accessed by the processing device 102.

The one or more I/O devices 106 may include a keyboard, a keypad, a touchpad, a mouse, and/or other input receiving devices. Also, the one or more I/O devices 106 may provide system outputs via a display device, monitor, User Interface (UI), Graphical User Interface (GUI), a printer, and/or other user output devices.

Series of Network Components

FIG. 8 is a schematic diagram illustrating an embodiment of a network 200 having a series of nodes, including a first node 202 (e.g., a terminal node), a second node 204, and a third node 206. A first pair of fiber spans 208 connects the first node 202 to the second node 204. A second pair of fiber spans 210 connects the second node 204 to the third node 206. Also, a third pair of fiber spans 212 connects the third node 206 to an extended portion (not shown) of the network 200.

The first node 202 may be configured as a Reconfigurable Optical Add/Drop Multiplexer (ROADM) having a multiplexer/demultiplexer (mux/demux) device 214 and a transmitter/receiver (Tx/Rx) device 216 configured at one end thereof. The mux/demux device 214 and Tx/Rx device 216 may be configured for adding and dropping optical channels. At the other end of the first node 202, a switchable loopback assembly 228 is arranged. For example, the switchable loopback assembly 228 may include line-facing switches connected to the first pair of fiber spans 208. Also, when switched to testing mode, the switches of the switchable loopback assembly 228 are configured to direct internally propagating test signals in a loopback manner through a loopback connector to keep the test signals internal to the first node 202.

Also, the second node 204 in this embodiment may include a switchable loopback assembly 230 at one end facing the first pair of fiber spans 208 and another switchable loopback assembly 232 at the other end facing the second pair of fiber spans 210. Again, each switchable loopback assembly 230, 232 includes two switches and a loopback connector for enabling loopback propagation to keep test signals internal to the second node 204.

In addition, the third node 206 in this embodiment may include a switchable loopback assembly 234 at one end facing the second pair of fiber spans 210 and another switchable loopback assembly 236 at the other end facing the third pair of fiber spans 212. Again, each switchable loopback assembly 234, 236 includes two switches and a loopback connector for enabling loopback propagation to keep test signals internal to the third node 206.

Automatic Node Testing Process

Figure 9:
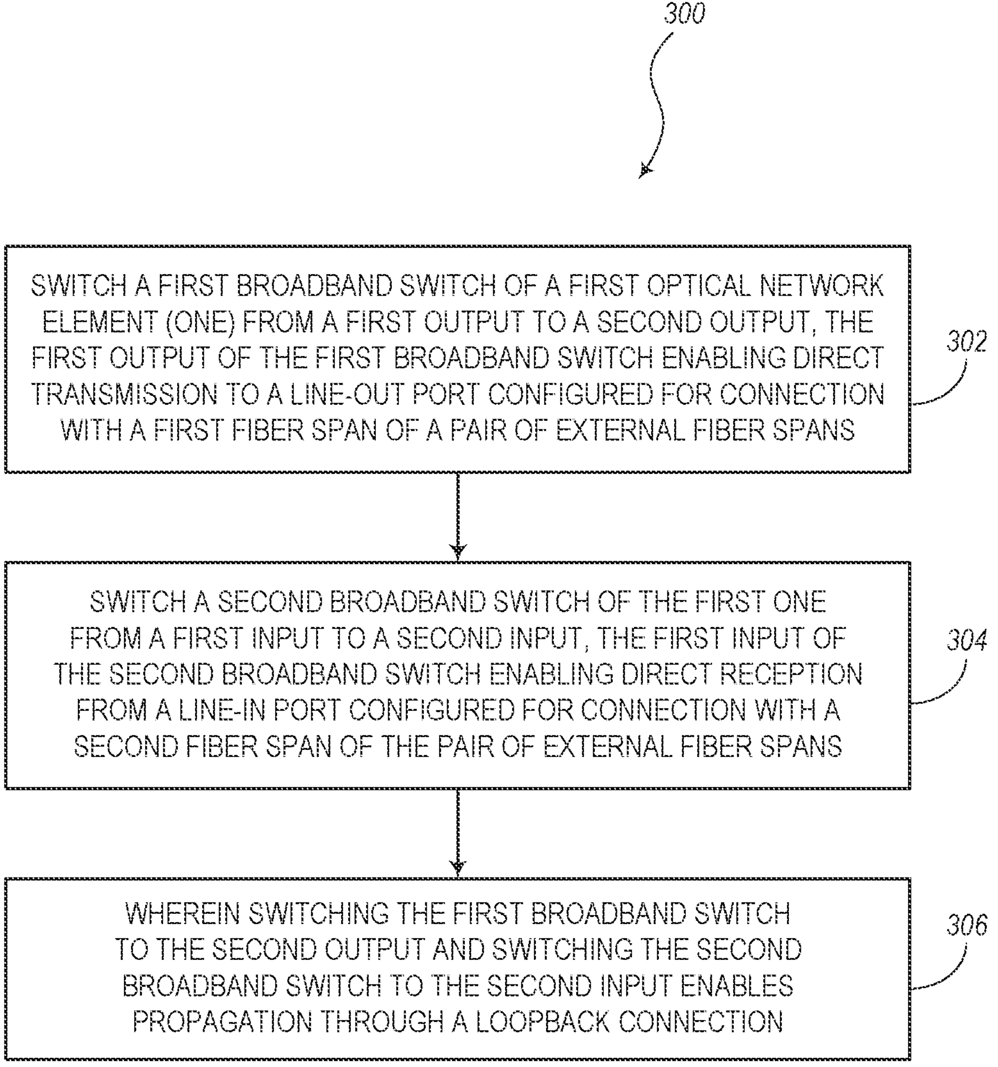
FIG. 9 is a flow diagram illustrating a process for testing a ONE or network node using a standalone loopback procedure, according to various embodiments.

FIG. 9 is a flow diagram illustrating one implementation of a process 300 for testing an Optical Network Element (ONE) or network node using a standalone loopback procedure. For example, the process 300 may be incorporated in the functionality of the standalone validation program 114 shown in FIG. 7 for enabling the controller 100 to perform a remote loopback test (e.g., from a NOC), in an isolated manner, on a ONE or node.

According to some embodiments, the process 300 includes a step of switching a first broadband switch of a first ONE from a first output to a second output, as indicated in block 302. The first output of the first broadband switch, for example, enables direct transmission to a line-out port configured for connection with a first fiber span of a pair of external fiber spans. The process 300, as shown in FIG. 9, further includes a step of switching a second broadband switch of the first ONE from a first input to a second input, as indicated in block 304. The first input of the second broadband switch, for example, enables direct reception from a line-in port configured for connection with a second fiber span of the pair of external fiber spans. As indicated in block 306, the actions of switching the first broadband switch to the second output and switching the second broadband switch to the second input enables propagation through a loopback connection.

According to additional embodiments, the process 300 may further include a step of configuring an amplifier of the remote ONE to propagate Amplified Spontaneous Emission (ASE) test signals through the loopback connection for testing the remote ONE. The process 300 may also include a step of turning on a plurality of pumps of a Raman amplifier, coupled to an output of the second broadband switch, one at a time, at a low level, for testing the Raman amplifier pump functionalities.

In some embodiments, the process 300 may include steps of a) switching a third broadband switch of the remote ONE from a first output to a second output, the first output of the third broadband switch enabling direct transmission to a second line-out port configured for connection with a first fiber span of a second pair of external fiber spans, and b) switching a fourth broadband switch of the remote ONE from a first input to a second input, the first input of the fourth broadband switch enabling direct reception from a second line-in port configured for connection with a second fiber span of the second pair of external fiber spans, wherein switching the third broadband switch to the second output (step a) and switching the fourth broadband switch to the second input (step b) enables propagation through a second loopback connection for testing the remote ONE.

The process 300, in some implementations, may further include steps of a) receiving test parameters from Optical Supervisory Channel (OSC) and telemetry components of the remote ONE, the OSC and telemetry components configured to monitor optical signals propagating through the remote ONE, b) determining test results related to connectivity and loss parameters of the remote ONE, and c) providing the test results to an installer of the remote ONE while the installer is on site at the remote ONE.

Therefore, the embodiments of the present disclosure involve adding a switchable optical loopback on the line-facing ports or card elements and creating an optical seam so that all intra-node active elements and fiber-connections can be verified. For example, with the loopback assemblies built into the ONEs as described herein to provide a standalone nodal-verification tool, the controller 100 can automatically turns on an amplifier (e.g., amplifier 78) in one direction (West-to-East) in such a way that it blocks any incoming light at the West input (and hence creates an optical-seam). Thus, the amplifier 78 can generate or forward Amplified Spontaneous Emission (ASE) on the output, while keeping the amplifier (e.g., amplifier 66) in other direction in a normal gain mode.

The system may be configured to switch all optical outputs from line-out to line-in direction at both ends and turn on all Raman pumps. The OSC and telemetry signaling components can confirm, for example, that a) all intra-node active optical elements (e.g., Raman pumps, AMPs, OSC and telemetry, etc.) are in good working condition and hence no card replacement is required, b) all intra-node fibers are connected properly with no extra loss in between them, among other conditions.

With a line-in port internally switched to the loopback, a Raman controller can turn on all pumps at low power and can vary the pump ratios without worrying about laser-safety or damaging external equipment and fiber-tips. Any supervisory communication can discover its own Rx and confirm the working condition. Also, fiber loss measurements can be verified between all amp and Raman card elements. Any loose connectors or Automatic Power Reduction (APR), due to high back-reflection, can also be identified. Once the verification is completed, the optical loopback can be released (or bypassed) on each end and the amplifiers can be set back to regular gain mode for regular traffic operations. Also, the controller 100 may be configured to raise any local or remote warnings and/or alarms to applicable personnel, such as the installer at the ONE site during installation, a network operator (or administrator) associated with a Network Operating Center (NOC). The warnings and alarms can provide visibility to network personnel while loopback and ASE modes are active.

It may be noted that the embodiments of the present disclosure are able to overcome many issue of conventional systems when a network element is installed in a network. Also, the embodiments of the switchable internal loopback assemblies discussed herein include various advantages. For example, installers do not need to carry a long (e.g., 20 km) external fiber spool with them on truck rolls. The disclosed embodiments also help to bypass OTDR go/no-go decisions for Raman turn-up since loopback is internal and not connected to external faceplate ports. Furthermore, the embodiments of the present disclosure can be used for per fiber-pair network verifications for data-path connectivity and link budget analysis (or performance hunt) during an initial deployment phase or on-field out-of-service debugging phase. With switchable line-side loopback assemblies, traffic can be looped back to itself on any given span to investigate specific fiber spans, link-budget performance issues, data-path connectivity, SNR performance, etc. of certain segments of a network, as described with respect to FIG. 8.

In addition, in some cases (primarily during a deployment phase), a network operator (or admin) may wish to know if the Tx/Rx can carry the data over the real fiber spans. If it cannot, then the network operator may wish to know exactly where (at which pair of fiber spans) the system runs into problems. In some cases, this exercise is important for link budget analysis (or power hunting) to identify optimal launch powers for a given pair of fiber spans. Also, the concept of looping back on a fiber span is configured to provide such an opportunity where line-side loopback can be activated per fiber-pair one by one as if it is a ladder network. The present embodiments are an improvement over conventional processes of simple Tx to Rx loopback with an external fiber or looping back via since the ROADM WSS will not normally unveil such opportunity.

Furthermore, the embodiments described herein can provide other benefits to customers (e.g., network owners, network operators, admin, installers, etc.). These embodiments can be key to providing a one-stop deployment solution for customers, which may be more like a digital solution (e.g., pass/fail) for their installers in the field who may be inexperienced or not have a strong optical deployment background. By simplifying the installation process, these customers can offer their installers a one-click deployment solution, which can benefit both the customers and the installers. Thus, the embodiments described herein may be configured to test a line amp site or a ROADM degree during installation and before adjacent sites are up and running. This may include standalone verification of the site.

CONCLUSION

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An Optical Network Element (ONE) comprising:

a line-out port configured for connection with a first fiber span of a pair of external fiber spans;

a line-in port configured for connection with a second fiber span of the pair of external fiber spans;

a first broadband switch having a first output and a second output, the first output of the first broadband switch coupled directly to the line-out port;

a second broadband switch having a first input and a second input, the first input of the second broadband switch coupled directly to the line-in port;

a loopback connection arranged between the second output of the first broadband switch and the second input of the second broadband switch;

a second line-out port configured for connection with a first fiber span of a second pair of external fiber spans;

a second line-in port configured for connection with a second fiber span of the second pair of external fiber spans;

a third broadband switch having a first output and a second output, the first output of the third broadband switch coupled directly to the second line-out port;

a fourth broadband switch having a first input and a second input, the first input of the fourth broadband switch coupled directly to the second line-in port; and a second loopback connection arranged between the second output of the third broadband switch and the second input of the fourth broadband switch.

2. The ONE of claim 1, wherein switching the first broadband switch to the second output and switching the second broadband switch to the second input causes optical signals to propagate through the loopback connection to enable loopback testing of the ONE.

3. The ONE of claim 1, further comprising an optical source configured to produce Amplified Spontaneous Emission (ASE) test signals, wherein, when the first broadband switch is switched to the second output and the second broadband switch is switched to the second input, the ASE test signals are propagated through the loopback connection for testing the ONE.

4. The ONE of claim 1, further comprising a Raman amplifier coupled to an output of the second broadband switch.

5. The ONE of claim 4, wherein the Raman amplifier includes a plurality of pumps, and wherein, during a loopback test involving the loopback connection, each pump of the Raman amplifier is turned on, one at a time, at a low level.

6. The ONE of claim 1, further comprising a pre-amp switch and an amplifier, an output of the pre-amp switch connected to the amplifier, the pre-amp switch configured in either a test power mode or a gain mode, wherein:

in the test power mode, the pre-amp switch is configured to provide Amplified Spontaneous Emission (ASE) test signals to the amplifier for testing the ONE, and in the gain mode, the pre-amp switch is configured to pass incoming signals to the amplifier for regular amplification.

7. The ONE of claim 1, wherein the ONE is one of an Intermediate Line Amplifier (ILA), a Reconfigurable Optical Add/Drop Multiplexer (ROADM) and a Terminal Line Amplifier (TLA).

8. The ONE of claim 1, further comprising Optical Supervisory Channel (OSC) and/or telemetry components for monitoring optical signals propagating through the ONE, wherein monitored connectivity and loss parameters are communicated to a remote management system for determining a condition of the ONE.

9. The ONE of claim 1, wherein the ONE is part of a network including one or more additional optical network elements each having a loopback connection assembly for enabling loopback testing of different portions of the network.

10. A method comprising the steps of:

switching a first broadband switch of a remote Optical Network Element (ONE) from a first output to a second output, the first output of the first broadband switch enabling direct transmission to a line-out port configured for connection with a first fiber span of a pair of external fiber spans;

switching a second broadband switch of the remote ONE from a first input to a second input, the first input of the second broadband switch enabling direct reception from a line-in port configured for connection with a second fiber span of the pair of external fiber spans;

wherein switching the first broadband switch to the second output and switching the second broadband switch to the second input enables propagation through a loopback connection for testing the remote ONE;

switching a third broadband switch of the remote ONE from a first output to a second output, the first output of the third broadband switch enabling direct transmission to a second line-out port configured for connection with a first fiber span of a second pair of external fiber spans; and switching a fourth broadband switch of the remote ONE from a first input to a second input, the first input of the fourth broadband switch enabling direct reception from a second line-in port configured for connection with a second fiber span of the second pair of external fiber spans;

wherein switching the third broadband switch to the second output and switching the fourth broadband switch to the second input enables propagation through a second loopback connection for testing the remote ONE.

11. The method of claim 10, further comprising a step of configuring an amplifier of the remote ONE to propagate Amplified Spontaneous Emission (ASE) test signals through the loopback connection for testing the remote ONE.

12. The method of claim 10, further comprising a step of turning on a plurality of pumps of a Raman amplifier, coupled to an output of the second broadband switch, one at a time, at a low level, for testing the Raman amplifier.

13. The method of claim 10, further comprising steps of:

receiving test parameters from Optical Supervisory Channel (OSC) and telemetry components of the remote ONE, the OSC and telemetry components configured to monitor optical signals propagating through the remote ONE, determining test results related to connectivity and loss parameters of the remote ONE, and providing the test results to an installer of the remote ONE while the installer is on site at the remote ONE.

14. An Optical Network Element (ONE) comprising:

a line-out port configured for connection with a first fiber span of a pair of external fiber spans;

a line-in port configured for connection with a second fiber span of the pair of external fiber spans;

a first broadband switch having a first output and a second output, the first output of the first broadband switch coupled directly to the line-out port;

a second broadband switch having a first input and a second input, the first input of the second broadband switch coupled directly to the line-in port;

a loopback connection arranged between the second output of the first broadband switch and the second input of the second broadband switch; and a pre-amp switch and an amplifier, an output of the pre-amp switch connected to the amplifier, the pre-amp switch configured in either a test power mode or a gain mode, wherein:

in the test power mode, the pre-amp switch is configured to provide Amplified Spontaneous Emission (ASE) test signals to the amplifier for testing the ONE, and in the gain mode, the pre-amp switch is configured to pass incoming signals to the amplifier for regular amplification.

15. The ONE of claim 14, wherein switching the first broadband switch to the second output and switching the second broadband switch to the second input causes optical signals to propagate through the loopback connection to enable loopback testing of the ONE.

16. The ONE of claim 14, further comprising an optical source configured to produce Amplified Spontaneous Emission (ASE) test signals, wherein, when the first broadband switch is switched to the second output and the second broadband switch is switched to the second input, the ASE test signals are propagated through the loopback connection for testing the ONE.

17. The ONE of claim 14, further comprising a Raman amplifier coupled to an output of the second broadband switch.

18. The ONE of claim 1, wherein the ONE is one of an Intermediate Line Amplifier (ILA), a Reconfigurable Optical Add/Drop Multiplexer (ROADM) and a Terminal Line Amplifier (TLA).

19. The ONE of claim 14, further comprising Optical Supervisory Channel (OSC) and/or telemetry components for monitoring optical signals propagating through the ONE, wherein monitored connectivity and loss parameters are communicated to a remote management system for determining a condition of the ONE.

20. The ONE of claim 14, wherein the ONE is part of a network including one or more additional optical network elements each having a loopback connection assembly for enabling loopback testing of different portions of the network.

* * * * *